US012684515B2

(12) United States Patent
Kim

(10) Patent No.: US 12,684,515 B2
(45) Date of Patent: Jul. 14, 2026

(54) METHOD AND APPARATUS FOR DEPLOYING PRIVATE NETWORKS

(71) Applicant: ELECTRONICS AND TELECOMMUNICATIONS RESEARCH INSTITUTE, Daejeon (KR)

(72) Inventor: Tae Joong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 593 days.

(21) Appl. No.: 18/152,503

(22) Filed: Jan. 10, 2023

(65) Prior Publication Data

US 2023/0224846 A1 Jul. 13, 2023

(30) Foreign Application Priority Data

Jan. 12, 2022 (KR) ........................ 10-2022-0004720

(51) Int. Cl.
H04W 60/00 (2009.01)
H04W 52/36 (2009.01)

(52) U.S. Cl.
CPC ......... H04W 60/00 (2013.01); H04W 52/367 (2013.01)

(58) Field of Classification Search
CPC . H04W 60/00; H04W 52/367; H04W 52/143; H04W 52/325; H04W 52/50; H04W 52/243; H04W 52/38; H04W 88/08
See application file for complete search history.

(56) References Cited

U.S. PATENT DOCUMENTS

| | | | | |
|---|---|---|---|---|
| 5,778,322 | A | * | 7/1998 | Rydbeck ............. H04W 72/541 |
| | | | | 455/454 |
| 6,148,205 | A | * | 11/2000 | Cotton ................... H04W 60/00 |
| | | | | 455/418 |
| 8,761,825 | B2 | | 6/2014 | Jeon et al. |
| 8,792,886 | B2 | | 7/2014 | Meshkati et al. |
| 8,909,269 | B2 | | 12/2014 | Pedersen et al. |
| 9,497,714 | B2 | | 11/2016 | Nagaraja et al. |
| 10,278,162 | B2 | | 4/2019 | Cui et al. |
| 10,405,263 | B2 | | 9/2019 | Mukherjee |
| 11,102,657 | B2 | | 8/2021 | Yavuz et al. |
| 2007/0177546 | A1 | * | 8/2007 | Lee ................... H04W 36/0066 |
| | | | | 370/331 |

(Continued)

FOREIGN PATENT DOCUMENTS

| | | | |
|---|---|---|---|
| JP | 2012-525086 A | 10/2012 |
| KR | 10-2014-0131489 A | 11/2014 |

(Continued)

*Primary Examiner* — Charles T Shedrick
(74) *Attorney, Agent, or Firm* — Rabin & Berdo, P.C.

(57) ABSTRACT

An operation method of a base station in a communication system may comprise: transmitting a synchronization signal and system information by using a predetermined transmission power; performing a registration procedure with a registration target terminal based on the synchronization signal and the system information; increasing a transmission power value of the predetermined transmission power by a preset value when the registration procedure with the registration target terminal fails; and providing a private service to the terminal when the registration procedure with the registration target terminal is successful.

7 Claims, 7 Drawing Sheets

(56)  References Cited

U.S. PATENT DOCUMENTS

| | | | | |
|---|---|---|---|---|
| 2010/0273481 | A1* | 10/2010 | Meshkati | H04W 16/16 |
| | | | | 455/435.1 |
| 2012/0039265 | A1* | 2/2012 | Patel | H04W 52/247 |
| | | | | 370/329 |
| 2012/0142392 | A1* | 6/2012 | Patel | H04W 52/247 |
| | | | | 455/522 |
| 2013/0148522 | A1* | 6/2013 | Park | H04W 72/542 |
| | | | | 370/252 |
| 2013/0237262 | A1 | 9/2013 | Borran et al. | |
| 2013/0260755 | A1 | 10/2013 | Seo et al. | |
| 2013/0267241 | A1 | 10/2013 | Baek et al. | |
| 2018/0213579 | A1 | 7/2018 | Hong et al. | |
| 2021/0099915 | A1 | 4/2021 | Daniels et al. | |
| 2022/0078677 | A1* | 3/2022 | Yin | H04W 36/06 |
| 2023/0337166 | A1* | 10/2023 | Wang | H04W 60/04 |
| 2024/0235666 | A1* | 7/2024 | Parr | H04W 52/0229 |

FOREIGN PATENT DOCUMENTS

| | | | | |
|---|---|---|---|---|
| KR | 10-2019-0113229 A | 10/2019 | | |
| WO | WO-2018144936 A1 * | 8/2018 | | H04W 52/50 |

* cited by examiner

METHOD AND APPARATUS FOR DEPLOYING PRIVATE NETWORKS

CROSS-REFERENCE TO RELATED APPLICATIONS

This application claims priority to Korean Patent Application No. 10-2022-0004720, filed on Jan. 12, 2022, with the Korean Intellectual Property Office (KIPO), the entire contents of which are hereby incorporated by reference.

BACKGROUND

1. Technical Field

Exemplary embodiments of the present disclosure relate to a technique for deploying a private network, and more specifically, to a technique for deploying a private network capable of satisfying requirements of a specific purpose by suppressing interference between private networks.

2. Related Art

In 2016, the international telecommunication union-radiocommunication sector (ITU-R) has published visions and requirements for 5G mobile communication. Unlike the 4G mobile communication, the announced visions and requirements of 5G mobile communication have requested the development of standards that provide various services through three core services. These three core services are composed of an enhanced mobile broadband (eMBB) service that provides high-speed data, an ultra-reliable and low-latency communication (URLLC) service, and a massive Internet of things (mMTC) service, and requirements have been individually defined for each service. The reason why the ITU-R has specified three core services may be to prepare in advance in the technical specifications as convergence between numerous other industries and mobile communication emerges in the 5G mobile communication era.

Meanwhile, in recent years, governments of the respective countries are implementing policies that permit use of frequency bands by organizations that desire to deploy private networks in order to proactively discover convergence services by deploying self-organizing networks using the 5G mobile communication independently of networks of mobile carriers. However, there may be uncontrolled interference between the private networks, and it is required to solve such the interference problems.

SUMMARY

Exemplary embodiments of the present disclosure provide a method and an apparatus for deploying a private network capable of satisfying requirements of a specific purpose by suppressing interference due to overlapping coverages.

According to a first exemplary embodiment of the present disclosure, an operation method of a base station in a communication system may comprise: transmitting a synchronization signal and system information by using a predetermined transmission power; performing a registration procedure with a registration target terminal based on the synchronization signal and the system information; increasing a transmission power value of the predetermined transmission power by a preset value when the registration procedure with the registration target terminal fails; and providing a private service to the terminal when the registration procedure with the registration target terminal is successful.

The transmitting of the synchronization signal and system information may comprise: generating the synchronization signal and the system information; setting a transmission power for transmitting the synchronization signal and the system information to the predetermined transmission power; and transmitting the synchronization signal and the system information using the set transmission power.

The performing of the registration procedure may comprise: activating a timer to which a waiting time for registration is set; performing the registration procedure with the registration target terminal based on the synchronization signal and the system information; determining whether registration of the registration target terminal is completed; and defining the registration procedure as 'succeeded' when the registration of the registration target terminal is completed within an active period of the timer, and defining the registration procedure as 'failed' when the registration of the registration target terminal is not completed within the active period of the timer.

The private service may be provided using a transmission power determined based on a transmission power at a time when the registration target terminal completes the registration.

According to a second exemplary embodiment of the present disclosure, an operation method of a base station in a communication system may comprise: transmitting a synchronization signal and system information by using a predetermined transmission power; identifying whether registration states of registration target terminals are maintained based on the synchronization signal and the system information; reducing a transmission power value of the predetermined transmission power by a preset value when the registration states of the registration target terminals are maintained; and providing a private service to the registration target terminals when the registration states of the registration target terminals are released.

The transmitting of the synchronization signal and system information may comprise: generating the synchronization signal and the system information; setting a maximum transmission power to the predetermined transmit power; and transmitting the synchronization signal and the system information using the set transmission power.

The private service may be provided using a transmission power equal to or higher than a minimum transmission power level at which the registration states of the registration target terminals are maintained.

The identifying of whether the registration states of the registration target terminals are maintained may comprise: activating a timer to which a deregistration time is set; defining a result of the identifying as 'maintained' when the registration states of already registered terminals continue to be maintained within an active period of the timer, and defining the result of the identifying as 'deregistered' when the registration states of the registration target terminals do not continue to be maintained within the active period of the timer.

According to a third exemplary embodiment of the present disclosure, a base station may comprise: a processor; a memory electronically communicating with the processor; and instructions stored in the memory, wherein when executed by the processor, the instructions cause the base station to perform: transmitting a synchronization signal and system information to a registration target terminal while adjusting a transmission power; performing a registration procedure with the registration target terminal based on the synchronization signal and the system information; and when registration of the registration target terminal is completed, providing a private service using a transmission power at a time when the registration target terminal completes the registration.

In the transmitting of the synchronization signal and the system information, the instructions may further cause the base station to perform: setting a transmission power increased by a preset value from a transmission power previously used; and transmitting the synchronization signal and the system information to the registration target terminal using the increased transmission power.

In the performing of the registration procedure, the instructions may further cause the base station to perform: activating a timer to which a waiting time for registration is set; performing the registration procedure with the registration target terminal based on the synchronization signal and the system information; determining whether registration of the registration target terminal is completed; and defining the registration procedure as 'succeeded' when the registration of the registration target terminal is completed within an active period of the timer, and defining the registration procedure as 'failed' when the registration of the registration target terminal is not completed within the active period of the timer.

According to the present disclosure, a base station can adjust a transmission power in a step-wise manner to solve interference caused by overlap between coverages. Alternatively, the base station can resolve interference due to overlap between coverages by adjusting a transmission power in a step-wise manner based on a timer or whether a predefined condition is satisfied. Alternatively, according to the present disclosure, a base station can continuously receive a call quality report at a signal level from a terminal, and can adjust a transmission power to resolve interference caused by overlap between coverages. In this manner, as the base station adjusts a transmission power to eliminate interference caused by overlap between coverages, a private network can secure an optimal quality of service (QoS).

In addition, according to the present disclosure, as the base station adjusts a transmission power to resolve interference caused by overlap between coverages, the private network can be deployed in a state independent of other private networks. In addition, according to the present disclosure, the private network can be operated independently of other private networks as the base station adjusts a transmission power to resolve interference caused by overlap between coverages.

DETAILED DESCRIPTION OF THE EMBODIMENTS

Figure 1:
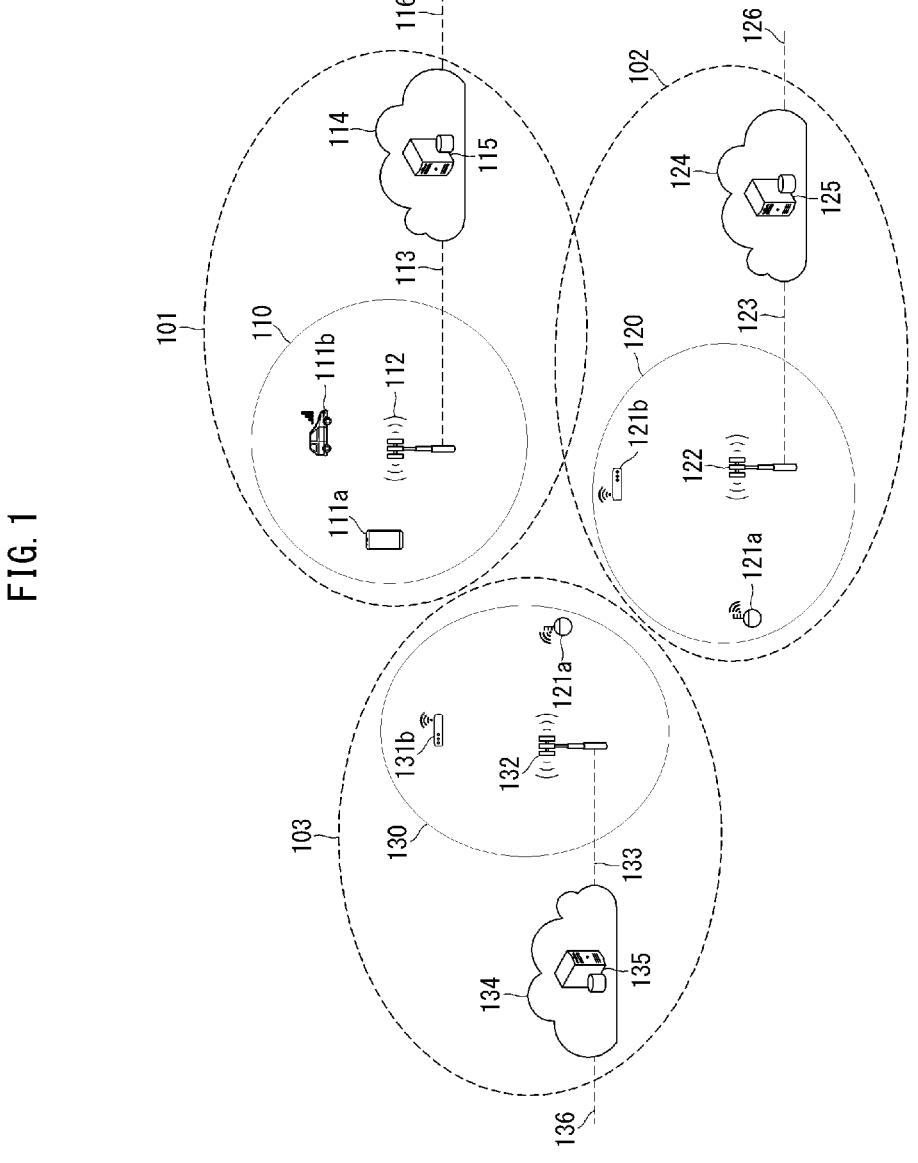
FIG. 1 is a conceptual diagram illustrating a first exemplary embodiment of private networks.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, beyond 5G (B5G) mobile communication network (e.g., 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

Meanwhile, the 3rd generation partnership project (3GPP) has reflected functions that can realize network slicing based on software defined networking (SDN)/network function virtualization (NFV) in the core network specifications, thereby providing a framework capable of providing various services in a mobile communication network. In addition, the 3GPP has reflected a mobile edge computing (MEC) structure in which a core network is located adjacently to a radio access network (RAN) base station in order to satisfy low-latency requirements.

In addition, in order to support services required in various industrial fields, attempts have been made to utilize the 5G mobile communication as an infrastructure that provides new convergence services based on three core services. However, these attempts remain at a level of demonstration projects, and may not lead to specific large-scale results yet. Reasons for this failure to lead to specific large-scale achievements may include the competition for initiative among players in the respective industries for convergence services, the lack of technological maturity in the early stage of commercialization of 5G communication, and security concerns of other industries regarding data generated from the convergence services.

Accordingly, in other industries, in order to proactively discover convergence services by deploying self-organizing networks using the 5G mobile communication independently of the networks of mobile carriers, a policy is being implemented domestically and internationally that provides licensed frequency bands for 5G mobile communication-based private networks (i.e., 5G private networks) and permits the use of the frequency bands to organizations that desire to deploy the 5G private networks.

The 5G private network using a licensed band may be operated completely independently of other 5G private networks, and actually-used network parameters may be set and operated to suit special purposes. Therefore, since uncontrolled interference may exist between the 5G private networks using the licensed band, the use of the licensed band may need to be permitted to the relevant organizations in a situation where coverages of the 5G private network are sufficiently separated from each other to eliminate such the interference. The private network refers to the network to be deployed locally for a specific purpose. The private service refers to the service to be provided locally for a specific purpose. The private network is any connection within a specified network wherein restrictions are established to promote a secured environment. This type of network can be configured in such a way that devices outside the network cannot access it. Only a selected set of devices can access this type of network depending on the settings encoded in the network routers and access points. On the other hand, a public network is defined as a network that anyone can freely connect to little or no restriction.

FIG. 1 is a conceptual diagram illustrating a first exemplary embodiment of private networks.

Referring to FIG. 1, a first private network 101 may include a first terminal #1 111a and a first terminal #2 111b, which receive a private service from a first base station 112, within a first specialized coverage 110. The first private network 101 may further include the first base station 112 in charge of the first specialized coverage 110. In addition, the first private network 101 may include a first MEC network 114 that controls the first base station 112. In addition, a second private network 102 may include a second terminal #1 121a and a second terminal #2 121b, which receive a private service from a second base station 122, within a second specialized coverage 120. The second private network 102 may further include the second base station 122 in charge of the second specialized coverage 120. In addition, the second private network 102 may include a second MEC network 124 that controls the second base station 122. Meanwhile, a third private network 103 may include a third terminal #1 131a and a third terminal #2 131b, which receive a private service from a third base station 132, within a third specialized coverage 130. The third private network 103 may further include the third base station 132 in charge of the third specialized coverage 130. In addition, the third private network 103 may include a third MEC network 134 that controls the third base station 132.

Here, the first to third MEC networks 114, 124, and 134 may be connected to the first to third base stations 112, 122, and 132 through first to third internal backhaul links 113, 123, and 133, respectively. In addition, the first to third MEC networks 114, 124, and 134 may control the first to third base stations 112, 122, and 132, respectively, so that the first to third base stations 112, 122, and 132 provide private services to the corresponding terminals 111*a* and 111*b*, 121*a* and 121*b*, and 131*a* and 131*b*. The first to third MEC networks 114, 124, and 134 may be connected to an external network and an application service data center through first to third external backhaul links 116, 126, and 136, respectively, thereby utilizing services provided externally. In this manner, each of the first to third private networks 101, 102, and 103 deployed for a specific purpose or private service managing a specific region may use the same licensed frequency band, but may include the first to third MEC networks 114, 124, and 134 existing independently, respectively. Here, the first to third MEC networks 114, 124, and 134 may include first to third MEC servers 115, 125, and 135 respectively responsible for the functions described above.

Meanwhile, each of the blocks shown in FIG. 1 may be variously configured as split functional blocks or configured with a combination of the split functional blocks. In addition, the first to third specialized coverages 110, 120, and 130 in FIG. 1 may be sufficiently spaced from each other and may not overlap each other. Accordingly, each of the first to third base stations 112, 122, and 132 may provide a private service to the corresponding terminals 111*a* and 111*b*, 121*a* and 121*b*, or 131*a* and 131*b* by using the entire licensed frequency band.

However, unlike the case of FIG. 1, if the deployment of private networks is more activated, a spacing between private service coverages may not be sufficient. Accordingly, each specialized coverage may need to be optimally deployed to expand the quality and supply of private services. In this regard, FIG. 2 shows private networks deployed when specialized coverages overlap.

Figure 2:
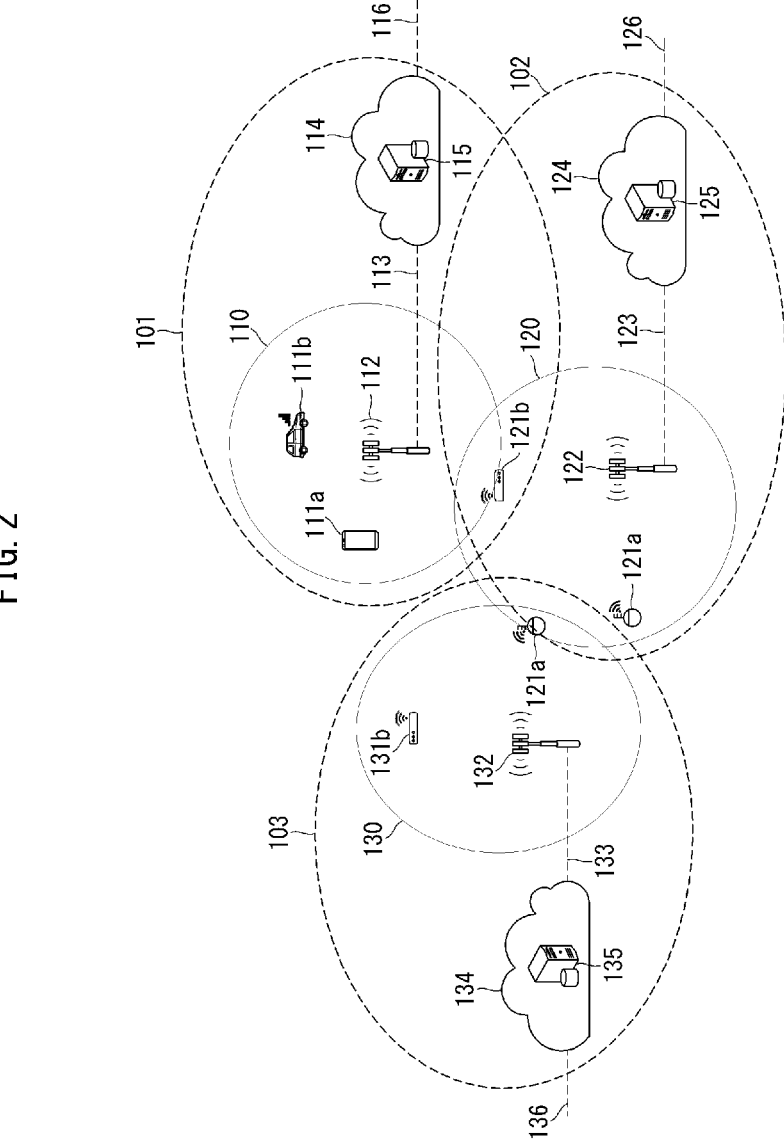
FIG. 2 is a conceptual diagram illustrating a second exemplary embodiment of private networks.

FIG. 2 is a conceptual diagram illustrating a second exemplary embodiment of private networks.

Referring to FIG. 2, the first to third private networks 101 to 103 may have the same configuration as that of FIG. 1. However, unlike the case of FIG. 1, the second specialized coverage 120 may partially overlap with the third specialized coverage 130, so interference may occur between the second private network 102 and the third private network 103.

In a typical mobile communication network, interference caused by overlapping coverages may be eliminated by a core network controlling base stations to minimize the overlapping coverages. Alternatively, interference caused by overlapping coverages may be resolved by controlling mobility of terminals between coverages. However, private networks based on independent MEC networks may not have an entity that can control each other. In addition, since private networks based on independent MEC networks do not even support mutual connections, there may be no way to resolve interference due to the overlapping coverages.

Accordingly, the private network may require a technique to solve the problem caused by the overlapping coverages so as to efficiently operate the independent private networks. In addition, a technique to solve the problem caused by the overlapping coverages may be required so that the private networks can be deployed at any time as needed. In addition, a technique to solve the problem caused by the overlapping coverages may be required so that the private networks can be moved at any time as needed.

Accordingly, in the present disclosure, a base station can adjust a transmission power in a step-wise manner to solve interference caused by overlapping coverages. In addition, in the present disclosure, a base station can adjust a transmission power in a step-wise manner based on a timer or whether a predefined condition is satisfied, thereby eliminating interference caused by overlapping between coverages. In addition, in the present disclosure, a base station may continuously receive a report of call quality at a signal level from a terminal and adjust a transmission power to resolve interference caused by the overlapping coverage. In this manner, as the base station adjusts a transmission power to eliminate interference caused by overlap between coverages, a private network can secure an optimal quality of service (QoS). As a result, the private network can be deployed and operated in a state independent of other private networks.

Figure 3:
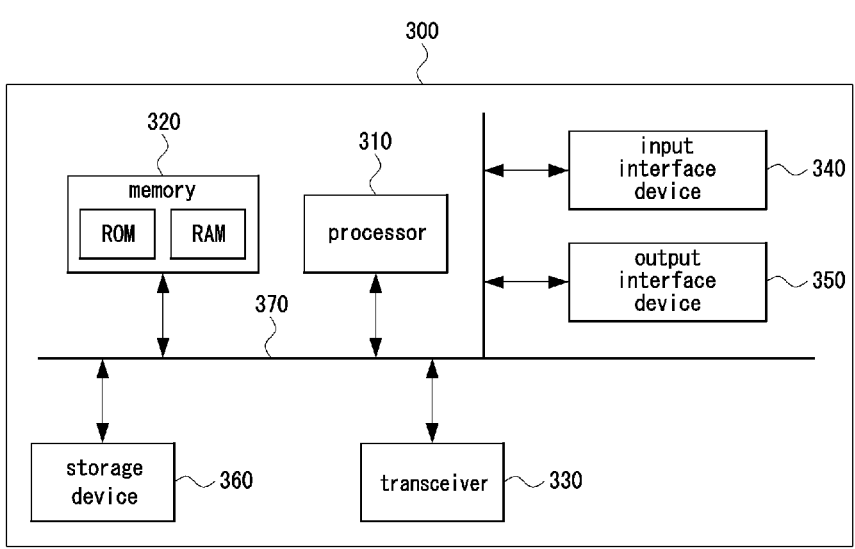
FIG. 3 is a block diagram illustrating a first exemplary embodiment of a communication node constituting a private network.

FIG. 3 is a block diagram illustrating a first exemplary embodiment of a communication node constituting a private network.

Referring to FIG. 3, a communication node 300, as a base station or a terminal, may comprise at least one processor 310, a memory 320, and a transceiver 330 connected to the network for performing communications. Also, the communication node 300 may further comprise an input interface device 340, an output interface device 350, a storage device 360, and the like. The respective components included in the communication node 300 may communicate with each other as connected through a bus 370. However, each component included in the communication node 300 may be connected to the processor 310 via an individual interface or a separate bus, rather than the common bus 370. For example, the processor 310 may be connected to at least one of the memory 320, the transceiver 330, the input interface device 340, the output interface device 350, and the storage device 360 via a dedicated interface.

The processor 310 may execute instructions stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM).

Hereinafter, a method of deploying the second private network when the first private network and the third private network are already deployed as in FIG. 2 will be described. To this end, in order to deploy the second private network, a private network operator may deploy the second terminal #1, the second terminal #2, the second base station, and the second MEC network including the MEC server in a region separated by a predetermined distance from the first private network and the third private network. In addition, the private network operator may connect the second MEC server of the second MEC network to the second base station through an internal backhaul link configured with an optical cable. In addition, the specialized operator may normally operate the second terminal #1 and the second terminal #2.

Figure 4:
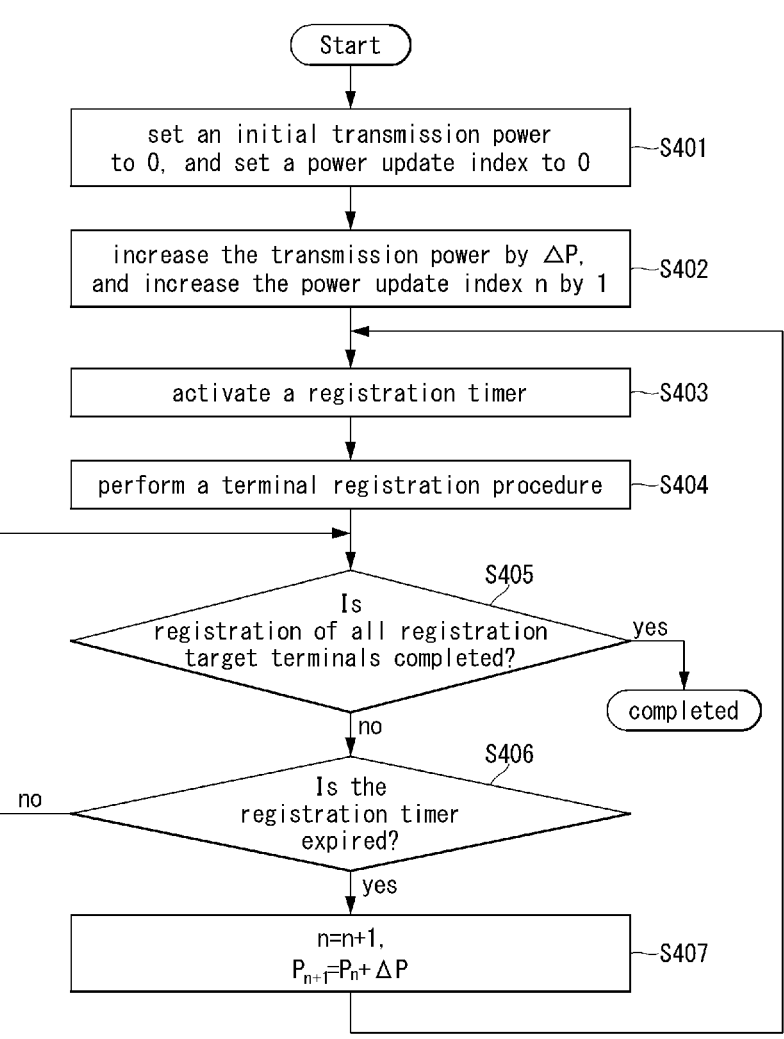
FIG. 4 is a flowchart illustrating a first exemplary embodiment of a method for deploying a private network.

FIG. 4 is a flowchart illustrating a first exemplary embodiment of a method for deploying a private network.

Referring to FIG. 4, in the method for deploying a private network, when powered on, the second base station may perform initialization and set an initial transmission power $P_0$ to 0 so that no radio signal is output. In addition, the second base station may set a power update index n to 0 in the initialization process (S401). Here, the second base station may retain terminal identifier (ID) information, maximum transmission power information, and power increase/decrease parameters for the second terminals #1 and #2. The second base station may manage terminal IDs of the second terminals #1 and #2 to be registered as information on registration target terminals. In the initialization step, the initial transmission power $P_0$ may be expressed as a current transmission power $P_n$.

Thereafter, the second base station may increase the power update index by 1, and update the current transmission power by increasing the current transmission power by a predetermined size $\Delta P$, thereby setting the updated transmission power $P_{n+1}$ (S402). The updated transmission power may be expressed as Equation 1. In addition, the second base station may activate a registration timer T (S403).

$$P_{n+1}=P_n+\Delta P \qquad \text{[Equation 1]}$$

Meanwhile, the second base station may perform a registration procedure with the second terminals #1 and #2 by using the updated transmission power (S404). Such the registration procedure may start when the second base station transmits a synchronization signal including a primary synchronization signal (PSS) and a second synchronization signal (SSS) to the second terminals #1 and #2. In addition, the second base station may transmit system information including configuration information for a random access procedure to the second terminals #1 and #2.

When the second base station increases the transmission power from 0 by $\Delta P$, neither of the second terminals #1 and #2 may be within the second specialized coverage. In this case, the second base station may determine whether all registration target terminals have completed registration (S405). At this time, as a result of the determination, all the registration target terminals may not have completed the registration. Subsequently, the second base station may determine whether the registration timer has expired (S406), and even if the registration timer has expired, all the terminals still may not have completed the registration. The second base station may define the registration procedure as 'failed' if the registration of the registration target terminals has not been completed within an active period of the registration timer. Accordingly, the second base station may increase the power update index by 1, and update the current transmission power by increasing the current transmission power by the predetermined size $\Delta P$, thereby setting the updated transmission power to $P_{n+1}$ (S407). Thereafter, the second base station may repeat from the step S403.

Meanwhile, when the second base station increases the transmission power by $\Delta P$, any terminal among the second terminals #1 and #2 may be within the second specialized coverage. In this manner, a terminal within the second specialized coverage may receive the synchronization signal from the second base station and acquire synchronization based on the received synchronization signal. In addition, the terminal within the second specialized coverage may receive the system information from the base station and select one of a plurality of selectable preamble sequences based on the received system information. Accordingly, the terminal within the second specialized coverage may transmit a random access preamble to the second base station based on the selected preamble sequence.

The second base station may receive the random access preamble from the terminal within the second specialized coverage. Then, the second base station may transmit a random access preamble (RAR) message to the terminal within the second specialized coverage. For example, the second base station may extract parameters included in the random access preamble received from the terminal within the second specialized coverage. The second base station may estimate a transmission timing of the terminal within the second specialized coverage according to an index of the random access preamble in order to acquire uplink synchronization for data transmission between the terminal within the second specialized coverage and the second base station. The second base station may transmit the random access response message, which is an access approval message including a time advance (TA), uplink timing alignment information based on the estimated transmission timing, to the terminal within the second specialized coverage.

The terminal within the second special coverage may transmit an uplink message and a terminal ID to the second base station. For example, the terminal within the second specialized coverage may determine a transmission timing based on the random access response message received from the second base station. The terminal within the second specialized coverage may transmit the uplink message including the terminal ID, which is identity information of the terminal within the second specialized coverage, and various information to the second base station through an uplink radio resource according to the determined transmission timing. Accordingly, the second base station may receive the uplink message including the terminal ID, which is the identity information, and various types of information from the terminal within the second specialized coverage. Accordingly, the second base station may register the terminal within the second specialized coverage based on the received uplink message.

As described above, the second base station may perform the registration procedure with the terminal within the second specialized coverage, which is capable of receiving the synchronization signals and the system information. Thereafter, the second base station may determine whether all terminals to be registered have completed the registration process through the stored registration target terminal information (S405). As a result of the determination, the second base station may complete the operation for deploying the private network (i.e., second private network) when all registration target terminals have completed the registration process. The second base station may define the registration procedure as 'succeeded' if the registration of all the registration target terminals has been completed within the active period of the registration timer. Accordingly, the second base station may complete the private network deployment process and provide a private service to the second terminals #1 and #2. On the other hand, the second base station may determine whether the registration timer has expired if all the registration target terminals have not completed the registration procedure as the result of the determination (S406). As a result of the determination, if the registration timer has not expired, the second base station may wait and repeat the step S405. On the other hand, the second base station may increase the power update index by 1 if the registration timer expires, and update the current transmission power by increasing the current transmission power by the predetermined size $\Delta P$, thereby setting the updated transmission power to $P_{n+1}$ (S407). Then, the second base station may activate the registration timer again (S403), and may proceed with the registration procedure with the second terminals by using the updated transmission power (S404).

Meanwhile, although it has been described that the second base station and the second MEC network perform operations separately, the second base station and the second MEC server may be integrated and operated without separate distinction.

Figure 5:
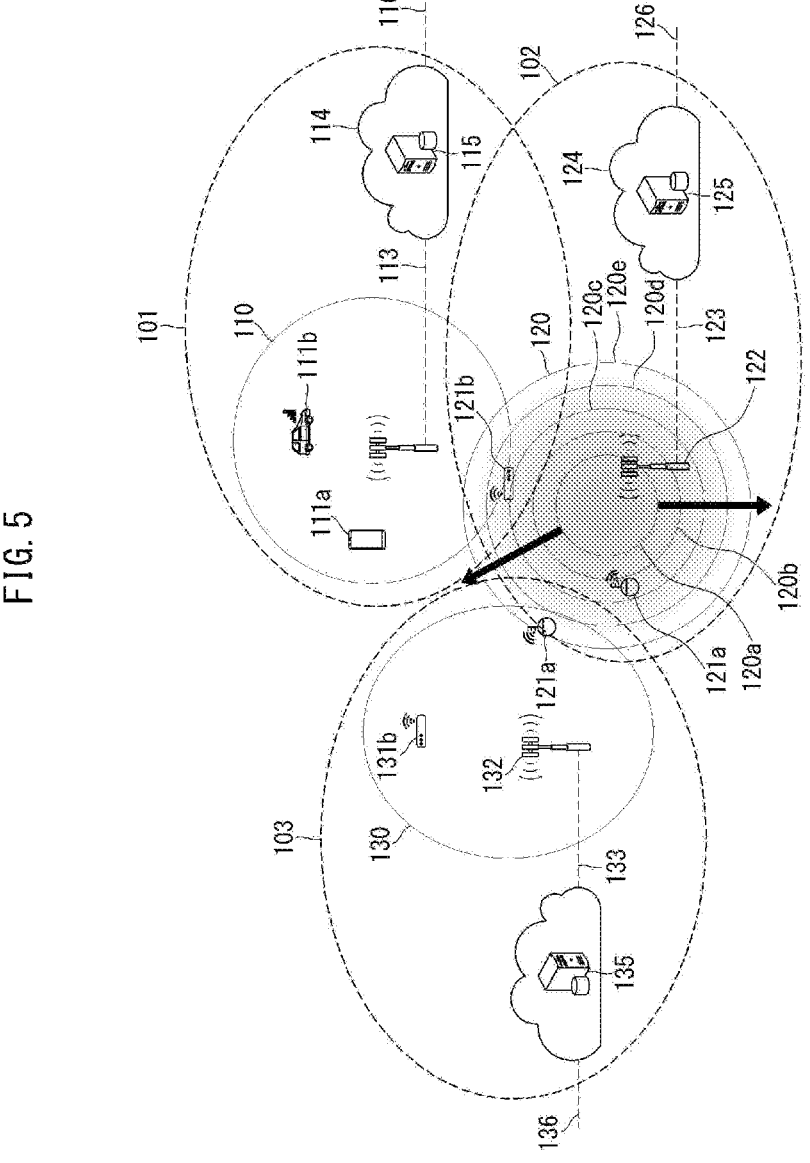
FIG. 5 is a conceptual diagram illustrating a first exemplary embodiment of a method for deploying a private network.

FIG. 5 is a conceptual diagram illustrating a first exemplary embodiment of a method for deploying a private network.

Referring to FIG. 5, in the method for deploying a private network, the second base station may form a first preliminary specialized coverage 120*a* using the updated transmission power increased firstly. In addition, the second base station may form a second preliminary specialized coverage 120*b* by using the updated transmission power increased secondly. In addition, the second base station may form a third preliminary specialized coverage 120*c* using the updated transmission power increased thirdly. In addition, the second base station may form a fourth preliminary specialized coverage 120*d* by using the updated transmission power increased fourthly. Finally, the second base station may form a fifth preliminary specialized coverage 120*e* using the updated transmission power increased fifthly.

Since the second terminal #1 121*a* is located in the third preliminary specialized coverage 120*c*, registration thereof may be completed when the second base station 122 proceeds with the registration process using the updated transmission power increased thirdly. Also, since the second terminal #2 121*b* is located in the fourth preliminary specialized coverage 120*d*, registration thereof may be completed when the second base station 122 proceeds with the registration procedure using the updated transmission power increased fourthly. Since the second base station 122 has completed the registration procedure for all the registration target terminals using the updated transmission power increased fourthly, the fourth preliminary specialized coverage 120*d* may be determined as the second specialized coverage 120, and a private service may be provided to the determined second specialized coverage. It may be assumed that all the terminals have completed the registration when the power update index n is 4.

FIGS. 4 and 5 have described the method of deploying a private network by adjusting a power of a base station to increase in the step-wise manner. Alternatively, a private network may be deployed by adjusting a power of a base station to decrease in the step-wise manner. In this case, a method of deploying the second private network when the first private network and the third private network are already deployed as in FIG. 2 by adjusting a power of the second base station to decrease in the step-wise manner will be described. To this end, in order to deploy the second private network, a private network operator may deploy the second terminal #1, the second terminal #2, the second base station, and the second MEC network including the MEC server in a region separated by a predetermined distance from the first private network and the third private network. In addition, the private network operator may connect the second MEC server of the second MEC network to the second base station through an internal backhaul link configured with an optical cable. In addition, the specialized operator may normally operate the second terminal #1 and the second terminal #2.

Figure 6:
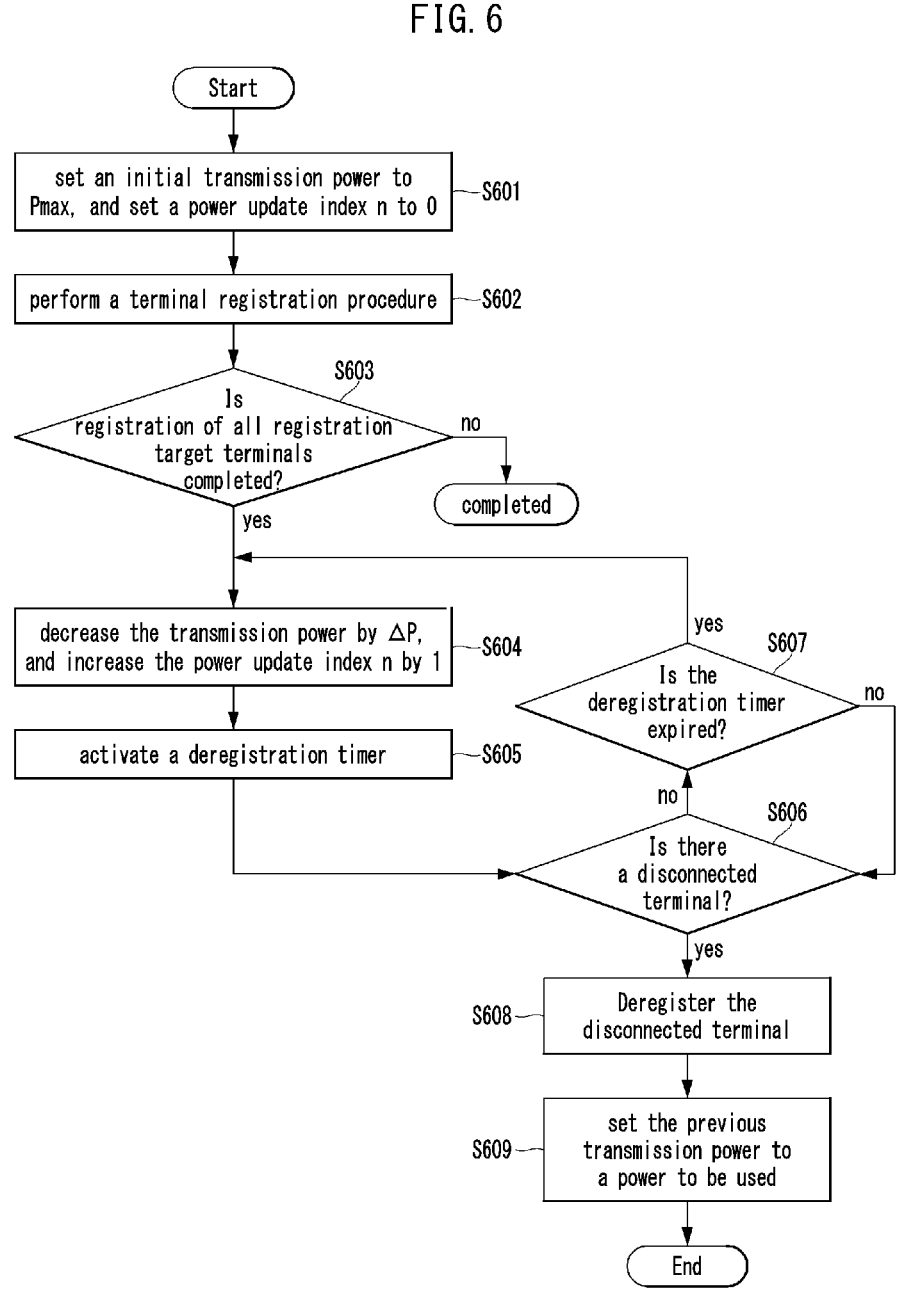
FIG. 6 is a flowchart illustrating a second exemplary embodiment of a method for deploying a private network.

FIG. 6 is a flowchart illustrating a second exemplary embodiment of a method for deploying a private network.

Referring to FIG. 6, in the method for deploying a private network, when powered on, the second base station may perform initialization and set an initial transmission power $P_0$ to a maximum power $P_{max}$ so that radio signals are output using the maximum transmission power. In addition, the second base station may set a power update index n to 0 in the initialization process (S601). Here, the second base station may retain terminal identifier (ID) information, maximum transmission power information, and power increase/decrease parameters for the second terminals #1 and #2. The second base station may manage terminal IDs of the second terminals #1 and #2 to be registered as information on registration target terminals. In the initialization step, the initial transmission power $P_0$ may be expressed as a current transmission power $P_n$.

Meanwhile, the second base station may perform a registration procedure with the second terminals #1 and #2 by using the maximum transmission power (S602). Such the registration procedure may start when the second base station transmits a synchronization signal including a PSS and a SSS to the second terminals #1 and #2. In addition, the second base station may transmit system information including configuration information for a random access procedure to the second terminals #1 and #2.

In this case, each of the second terminals #1 and #2 may receive the synchronization signal from the second base station within the maximum coverage of the second base station, and acquire synchronization based on the received synchronization signal. Further, each of the second terminals #1 and #2 may receive the system information from the base station and select one of a plurality of selectable preamble sequences based on the received system information. Accordingly, each of the second terminals #1 and #2 may transmit a random access preamble to the second base station based on the selected preamble sequence.

The second base station may receive the random access preamble from each of the second terminals #1 and #2. In addition, the second base station may transmit a RAR message to each of the second terminals #1 and #2.

Each of the second terminals #1 and #2 may receive the RAR message from the second base station. In addition, each of the second terminals #1 and #2 may transmit an uplink message and a terminal ID to the second base station. Accordingly, the second base station may receive the uplink message including the terminal ID, which is identity information, and various types of information from each of the second terminals #1 and #2. Accordingly, the second base station may register the second terminals #1 and #2 based on the received uplink messages.

As described above, the second base station may perform the registration procedure with the second terminals #1 and #2, which are capable of receiving the synchronization signals and the system information. Thereafter, the second base station may determine whether all terminals to be registered have completed the registration process through the stored registration target terminal information (S603). As a result of the determination, the second base station may determine that the second terminals #1 and #2 have completed the registration by performing the registration procedure. In this case, if all of the registration target terminals (i.e., the second terminals #1 and #2) do not have completed the registration, the corresponding deployment operation may be stopped and terminated with a system configuration problem.

On the other hand, when it is determined that registration of all the registration target terminals has been completed, the second base station may increase the power update index by 1, and update the current transmission power by decreasing the current transmission power by the predetermined size $\Delta P$, thereby setting the updated transmission power to $P_{n+1}$ (S604). This may be expressed as Equation 2. In addition, the second base station may activate a deregistration timer T (S605).

$$P_{n+1} = P_n - \Delta P \qquad \text{[Equation 2]}$$

Accordingly, the second specialized coverage formed by the second base station may be reduced. Accordingly, a radio link with a terminal that cannot receive signals from the second base station any longer among the second terminals may be disconnected. Of course, if the terminals are close to the second base station, the radio links therewith may not be disconnected. Accordingly, the second base station may determine whether there is a terminal (i.e., disconnected terminal) among previously registered terminals that cannot receive signals of the second base station and thus has interrupted communication (S606). As a result of the determination, the second base station may not have a terminal with which communication is disconnected. As such, if all terminals still maintain the registered state even after the second base station reduces the transmission power by $\Delta P$, this may mean that the second specialized coverage is sufficient to accommodate all the terminals. As such, the transmission power used by the second base station may be sufficient to accommodate all the terminals.

Accordingly, the second base station may determine whether the deregistration timer has expired (S607). If the deregistration timer has not expired, the second base station may proceed to the step S606 of determining whether there is a disconnected terminal. On the other hand, if all terminals are still in the registered state despite the expiration of the deregistration timer, the second base station may repeat from the step S604 of updating the current transmission power by decreasing the transmission power by the predetermined size $\Delta P$, thereby setting the updated transmission power to $P_{n+1}$. The second base station may define a result of the determination as 'maintained' if the registration state of the already registered registration target terminals continues to be maintained within the active period of the deregistration timer.

On the other hand, if a disconnected terminal exists as a result of determining whether there is a disconnected terminal, the second base station may release registration of the corresponding terminal (S608). As such, the second base station may define a result of the determination as 'deregistered' if the registration state of even one of the already registered registration target terminals is not maintained continuously within the active period of the deregistration timer. When the number of registered terminals decreases in this manner the second base station may determine that the second specialized coverage does not accommodate all terminals. This may mean that the currently set transmission power is insufficient. Accordingly, the second base station may complete the private network deployment operation after setting the transmission power determined based on the previous transmission power $P_{n-1}$) as a transmission power to be used (S609).

Figure 7:
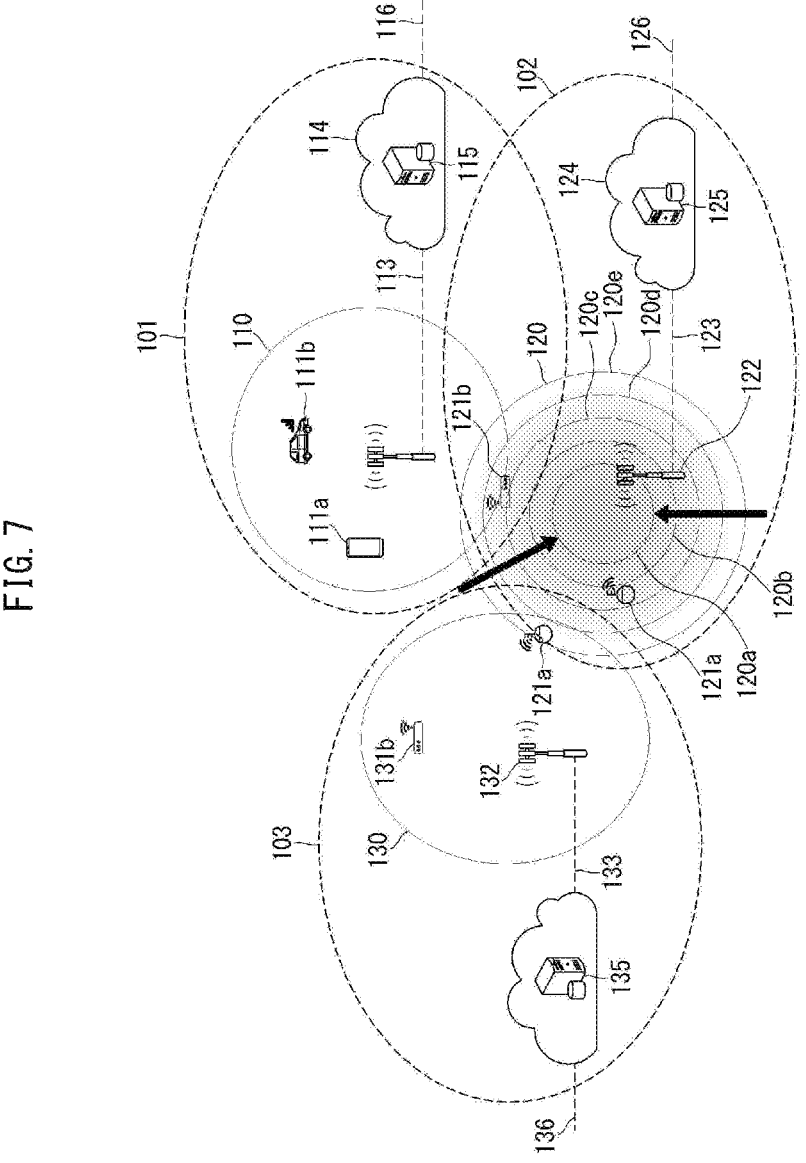
FIG. 7 is a conceptual diagram illustrating a second exemplary embodiment of a method for deploying a private network.

FIG. 7 is a conceptual diagram illustrating a second exemplary embodiment of a method for deploying a private network.

Referring to FIG. 7, in the method for deploying a private network, the second base station may form a fifth preliminary specialized coverage 120e using the maximum transmission power $P_{max}$. In addition, the second base station may form a fourth preliminary specialized coverage 120d using the updated transmission power decreased firstly. In addition, the second base station may form a third preliminary specialized coverage 120c using the updated transmission power decreased secondly. In addition, the second base station may form a second preliminary specialized coverage 120b using the updated transmission power decreased thirdly. Finally, the second base station may form a first preliminary specialization coverage 120a using the updated transmission power decreased fourthly.

Since the second terminal #2 is located within the fourth preliminary specialized coverage 120d, the registration thereof may be released when the first base station 122 uses the updated transmission power reduced secondly to obtain the third preliminary specialized coverage 120c. Accordingly, the second base station may decrease the number N (i.e., 2) of registered terminals by 1. In this manner, when the number of registered terminals is decreased by 1, the second base station may determine that the third preliminary specialized coverage does not accommodate all terminals. This may mean that the currently set transmission power is insufficient. Accordingly, the second base station may complete the private network deployment operation after setting the transmission power decreased firstly used in forming the previous fourth preliminary specialized coverage 120d to a transmission power to be used.

As described above, the private network deployment method according to the present disclosure can quickly find the optimal transmission power for configuring the private network. Accordingly, the private network deployment method according to the present disclosure may have an advantage in speedy processing of initial deployment and reconfiguration of a private network. In addition, the present disclosure may include a method and apparatus for using a terminal for testing to deploy and operate a private network. Meanwhile, a private network may need to be reconfigured when a terminal in operation through initial deployment needs to move, when a new private network needs to be deployed in an adjacent region (i.e., within a distance that can be affected by interference), and due to a change in a state of private networks deployed in adjacent regions. In this case, the private network may derive parameters for reconfiguration through the terminal for testing in a state where the currently operated private service is maintained, and may perform the reconfiguration using the derived parameters.

As such, according to the present disclosure, in deploying and operating a private network, the effect of interference on private networks deployed adjacently can be minimized through a function in which a base station gradually increases or decreases a transmission power. In addition, through the function of increasing or decreasing the transmission power in the step-wise manner by the base station, the optimal transmission power for the configuration of the private network can be quickly found, and the initial deployment and reconfiguration of the private network can be quickly performed.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a base station in a communication system, the operation method comprising:
   determining a first transmission power as an initial transmission power value when the base station is powered on;
   transmitting, to registration target terminals, a synchronization signal and system information by using the first transmission power;
   performing a registration procedure with the registration target terminals based on the synchronization signal and the system information;
   increasing the first transmission power by a predetermined transmission power value when one or more of the registration target terminals fail to register during the registration procedure; and
   providing a private service using the increased first transmission power when the registration procedure with all the registration target terminals is successful based on the increased first transmission power,
   wherein the performing of the registration procedure comprises:
      activating a timer to which a waiting time for registration is set;
      performing the registration procedure with all the registration target terminals based on the synchronization signal and the system information;
      determining the registration procedure as 'succeeded' when the registration for all the registration target terminals is completed within an active period of the timer; and
      determining the registration procedure as 'failed' when the registration for at least one of the registration target terminals is not completed within the active period of the timer.

2. The operation method according to claim 1, wherein the transmitting of the synchronization signal and system information comprises:

generating the synchronization signal and the system information to include configuration information for a random access procedure;
setting a transmission power for transmitting the synchronization signal and the system information to the first transmission power; and
transmitting the synchronization signal and the system information using the first transmission power.

3. An operation method of a base station in a communication system, the operation method comprising:
   determining a first transmission power as an initial transmission power value when the base station is powered on;
   transmitting, to registration target terminals, a synchronization signal and system information by using the first transmission power, which is a maximum transmission power;
   identifying whether registration states of all the registration target terminals are maintained based on the synchronization signal and the system information;
   reducing the first transmission power by a predetermined transmission power value when the registration states of all the registration target terminals are maintained; and
   providing a private service using the reduced first transmission power when the registration states of all the registration target terminals are maintained,
   wherein the identifying of whether the registration states of the registration target terminals are maintained comprises:
      activating a timer to which a deregistration time is set;
      determining a result of the identifying as 'maintained' when the registration states of already registered terminals continue to be maintained within an active period of the timer; and
      determining the result of the identifying as 'deregistered' when the registration states of the registration target terminals do not continue to be maintained within the active period of the timer.

4. The operation method according to claim 3, wherein the transmitting of the synchronization signal and system information comprises:
   generating the synchronization signal and the system information to include configuration information for a random access procedure;
   setting the maximum transmission power to the first transmission power; and
   transmitting the synchronization signal and the system information using the first transmission power.

5. The operation method according to claim 3, wherein the private service is provided using a transmission power equal to or higher than a minimum transmission power level at which the registration states of the registration target terminals are maintained.

6. A base station comprising:
   a processor;
   a memory electronically communicating with the processor; and
   instructions stored in the memory,
   wherein when executed by the processor, the instructions cause the base station to perform:
      determining a first transmission power as an initial transmission power value when the base station is powered on;
      transmitting, to registration target terminals, a synchronization signal and system information by using the first transmission power;

performing a registration procedure with the registration target terminals based on the synchronization signal and the system information;

increasing the first transmission power by a predetermined transmission power value when one or more of the registration target terminals fail to register during the registration procedure; and providing a private service using the increased first transmission power when the registration procedure with all the registration target terminals is successful based on the increased first transmission power, wherein in the performing of the registration procedure, the instructions further cause the base station to perform:

activating a timer to which a waiting time for registration is set;

performing the registration procedure with all the registration target terminals based on the synchronization signal and the system information;

determining the registration procedure as 'succeeded' when the registration for all the registration target terminals is completed within an active period of the timer; and determining the registration procedure as 'failed' when the registration for at least one of the registration target terminals is not completed within the active period of the timer.

7. The base station according to claim 6, wherein in the transmitting of the synchronization signal and the system information, the instructions further cause the base station to perform:

generating the synchronization signal and the system information to include configuration information for a random access procedure;

setting a transmission power for transmitting the synchronization signal and the system information to the first transmission power; and transmitting the synchronization signal and the system information to the registration target terminals using the first transmission power.

* * * * *